United States Patent
Lefebvre et al.

(10) Patent No.: US 9,683,458 B2
(45) Date of Patent: Jun. 20, 2017

(54) OIL SCUPPER SYSTEM FOR BEARING HOUSING OF GAS TURBINE ENGINE

(71) Applicant: PRATT & WHITNEY CANADA CORP., Longueuil (CA)

(72) Inventors: Guy Lefebvre, St-Bruno-de-Montarville (CA); Eric Durocher, Vercheres (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 124 days.

(21) Appl. No.: 14/831,320

(22) Filed: Aug. 20, 2015

(65) Prior Publication Data

US 2017/0051632 A1 Feb. 23, 2017

(51) Int. Cl.
*F01D 25/18* (2006.01)
*F01D 25/16* (2006.01)

(52) U.S. Cl.
CPC ............ *F01D 25/18* (2013.01); *F01D 25/162* (2013.01); *F05D 2220/32* (2013.01); *F05D 2240/55* (2013.01)

(58) Field of Classification Search
CPC ........ F01D 25/18; F01D 25/162; F01D 9/065; F05D 2220/32; F05D 2240/55; F16C 33/6659
See application file for complete search history.

(56) References Cited

U.S. PATENT DOCUMENTS

| | | |
|---|---|---|
| 3,090,544 A | 5/1963 | Woollenweber, Jr. et al. |
| 3,312,448 A | 4/1967 | Huil, Jr. et al. |
| 4,040,249 A * | 8/1977 | Kahle ............... F02C 3/085 165/8 |
| 4,339,160 A | 7/1982 | McHugh |
| 4,344,506 A | 8/1982 | Smith |
| 5,489,190 A | 2/1996 | Sullivan |
| 6,102,577 A | 8/2000 | Tremaine |
| 6,438,938 B1 | 8/2002 | Burkholder et al. |
| 7,055,303 B2 | 6/2006 | MacFarlane et al. |
| 7,568,843 B2 | 8/2009 | Lefebvre et al. |
| 8,177,488 B2 | 5/2012 | Manteiga et al. |
| 8,231,142 B2 | 7/2012 | Olver |
| 8,944,749 B2 | 2/2015 | Durocher et al. |
| 2007/0248295 A1 | 10/2007 | Kerr |
| 2008/0050061 A1 | 2/2008 | Lefebvre et al. |

(Continued)

FOREIGN PATENT DOCUMENTS

CA 2870742 A1 10/2013

*Primary Examiner* — William E Dondero
*Assistant Examiner* — Robert T Reese
(74) *Attorney, Agent, or Firm* — Norton Rose Fulbright Canada LLP

(57) ABSTRACT

A bearing housing comprises a body having a partition wall delimiting the bearing housing from an environment and defining a bearing housing interior cavity configured to receive an oil feed. An inlet bore is in the partition wall in fluid communication with the bearing housing interior cavity. The inlet bore is configured to receive an end of an oil tube, the inlet bore comprising a contact surface configured for contacting the oil tube. A seal is between the inlet bore and the oil tube. An oil recuperation passage is defined in the partition wall in fluid communication with the inlet bore between the seal and at least a portion of the contact surface, the oil recuperation passage being in fluid communication with an oil recuperating cavity.

19 Claims, 5 Drawing Sheets

(56) References Cited

U.S. PATENT DOCUMENTS

2011/0085895 A1    4/2011  Durocher et al.
2015/0377065 A1*  12/2015  Deane .................... F01D 9/065
                                                          285/15

* cited by examiner

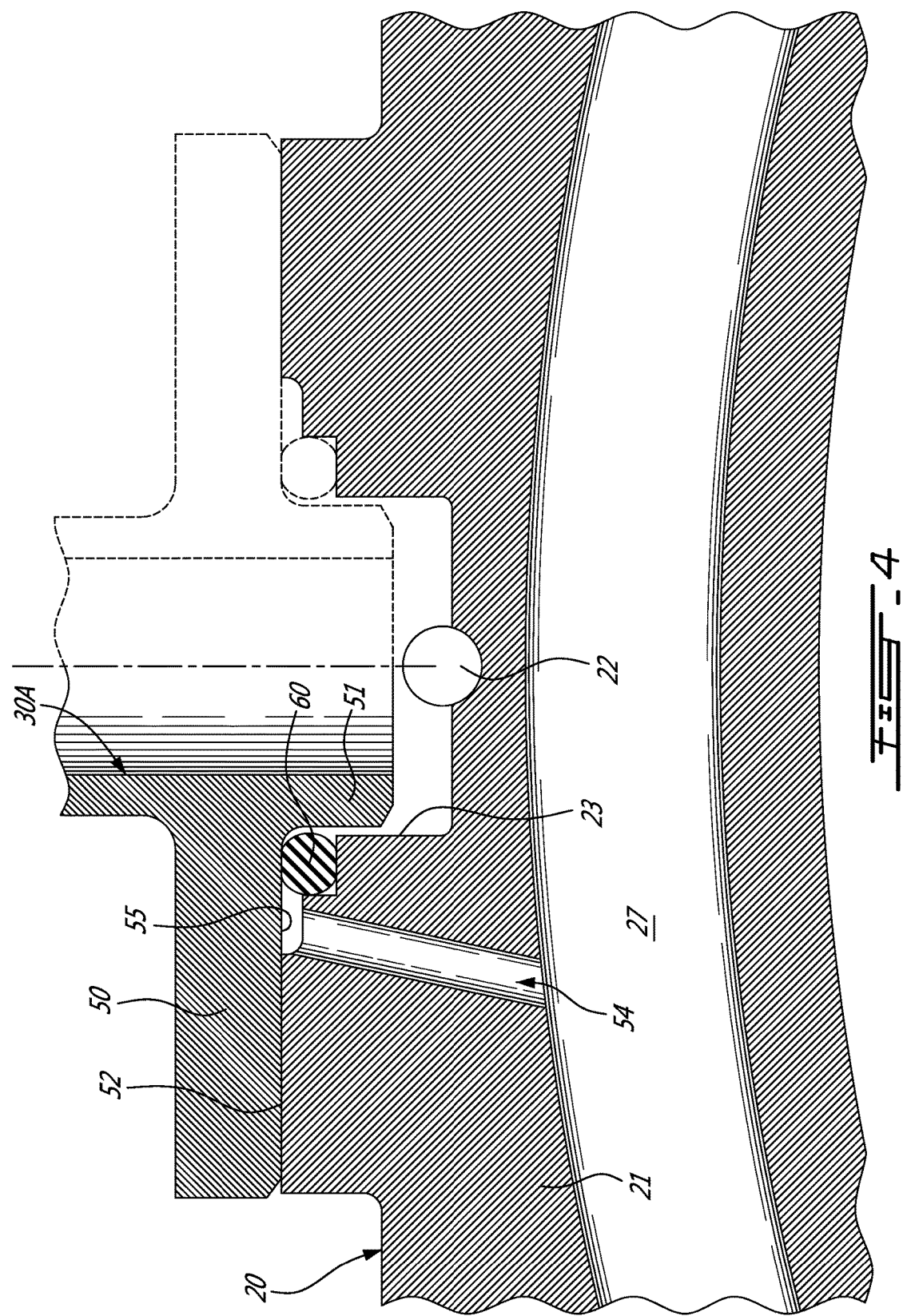

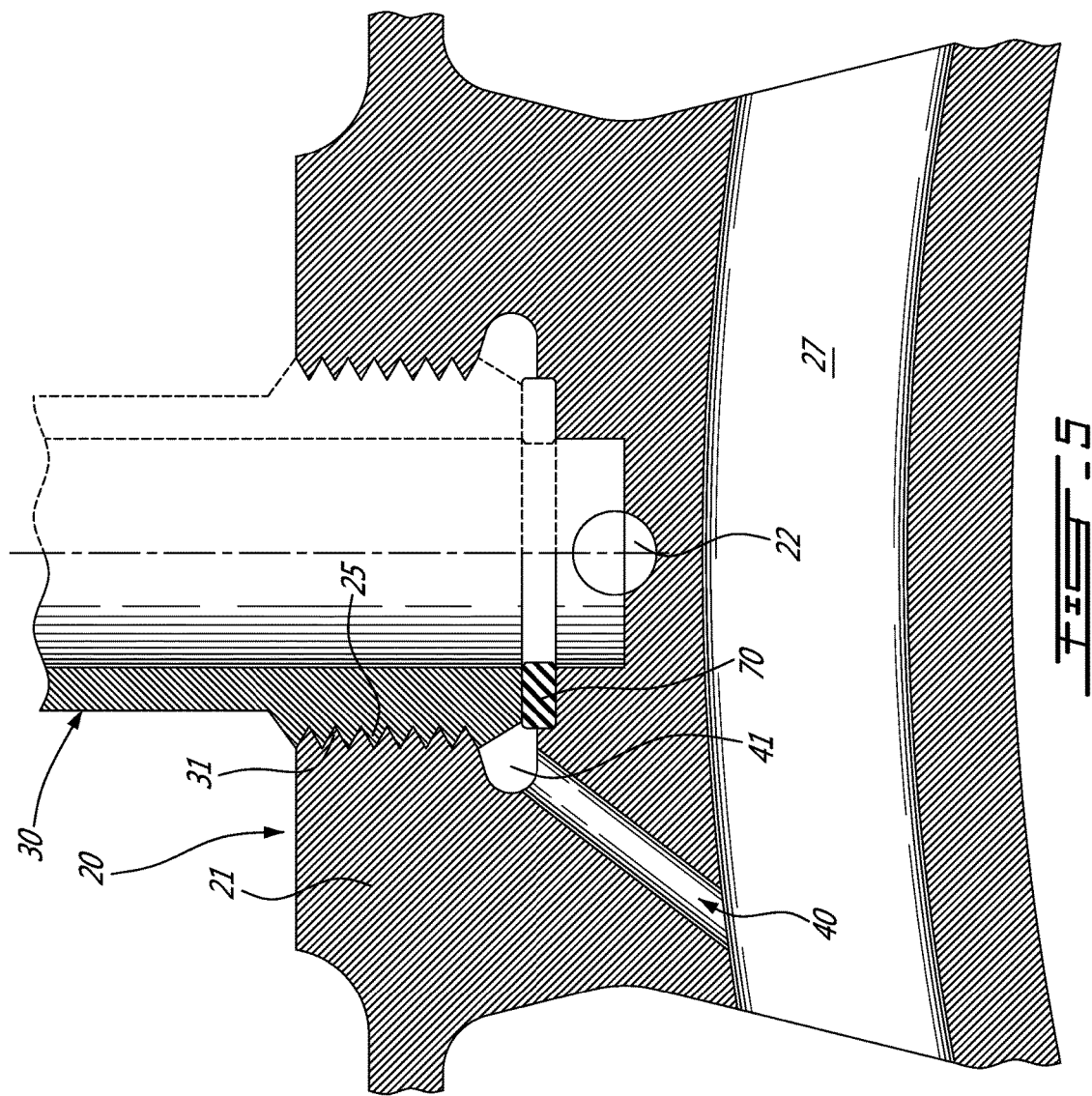

OIL SCUPPER SYSTEM FOR BEARING HOUSING OF GAS TURBINE ENGINE

TECHNICAL FIELD

The application relates generally to bearing housings in gas turbine engines, and to oil lubrication systems therefor.

BACKGROUND OF THE ART

Oil lubrication systems are commonly provided in gas turbine engines to feed oil to bearing housings to lubricate bearings. However, oil leakage may occur at the junction between oil tubes and the bearing housing. Oil leakage must be avoided as the presence of uncontained oil in engine portions may cause hazardous conditions and consequences to the engine, human health and environment.

SUMMARY

In one aspect, there is provided a bearing housing comprising: a body having a partition wall delimiting the bearing housing from an environment and defining a bearing housing interior cavity configured to receive an oil feed; an inlet bore in the partition wall in fluid communication with the bearing housing interior cavity, the inlet bore configured to receive an end of an oil tube, the inlet bore comprising a contact surface configured for contacting the oil tube; a seal between the inlet bore and the oil tube; and an oil recuperation passage defined in the partition wall in fluid communication with the inlet bore between the seal and at least a portion of the contact surface, the oil recuperation passage being in fluid communication with an oil recuperating cavity.

In a second aspect, there is provided a gas turbine engine comprising: a chamber; an oil lubrication system having at least one oil tube passing through the chamber, the oil tube having an outlet end and threading; a bearing housing comprising: a body having a partition wall delimiting the bearing housing from the chamber and defining a bearing housing interior cavity for receiving an oil feed; an inlet bore in the partition wall in fluid communication with the bearing housing interior cavity, the inlet bore connecting the outlet end of the oil tube to the bearing housing, the inlet bore comprising a contact surface contacting a surface of the outlet end of the oil conduit, and a seal between its surface and the oil tube; and an oil recuperation passage defined in the partition wall in fluid communication with the inlet bore between the seal and at least a portion of the contact surface; an oil recuperating cavity in fluid communication with the oil recuperation passage, wherein, in operation, a negative pressure differential between the oil recuperating cavity and the chamber induces a flow of oil leaked from the bearing housing interior cavity to the oil recuperation passage.

In a third aspect, there is provided a method for recuperating leaked oil in a bearing housing, the method comprising: directing oil, via an oil tube connected to an inlet bore in a partition wall of the bearing housing, to a bearing housing interior cavity in the bearing housing; leaking oil in the partition wall at a seal between an end of the oil tube and inlet bore; recuperating leaked oil in a recuperation passage in the partition wall, between the seal and a contact surface of the oil tube and the inlet bore; and directing the leaked oil to an oil recuperating cavity Further details of these and other aspects of the present invention will be apparent from the detailed description and figures included below.

DESCRIPTION OF THE DRAWINGS

Reference is now made to the accompanying figures, in which:

FIG. 4 is a schematic sectional view of a bearing housing with external tube connection and face seal, with an oil recuperation passage in accordance with another embodiment of the present disclosure; and FIG. 5 is a schematic sectional view of a bearing housing with external tube threaded connection and face seal, with an oil recuperation passage in accordance with another embodiment of the present disclosure.

DETAILED DESCRIPTION OF THE PREFERRED EMBODIMENTS

Figure 1:
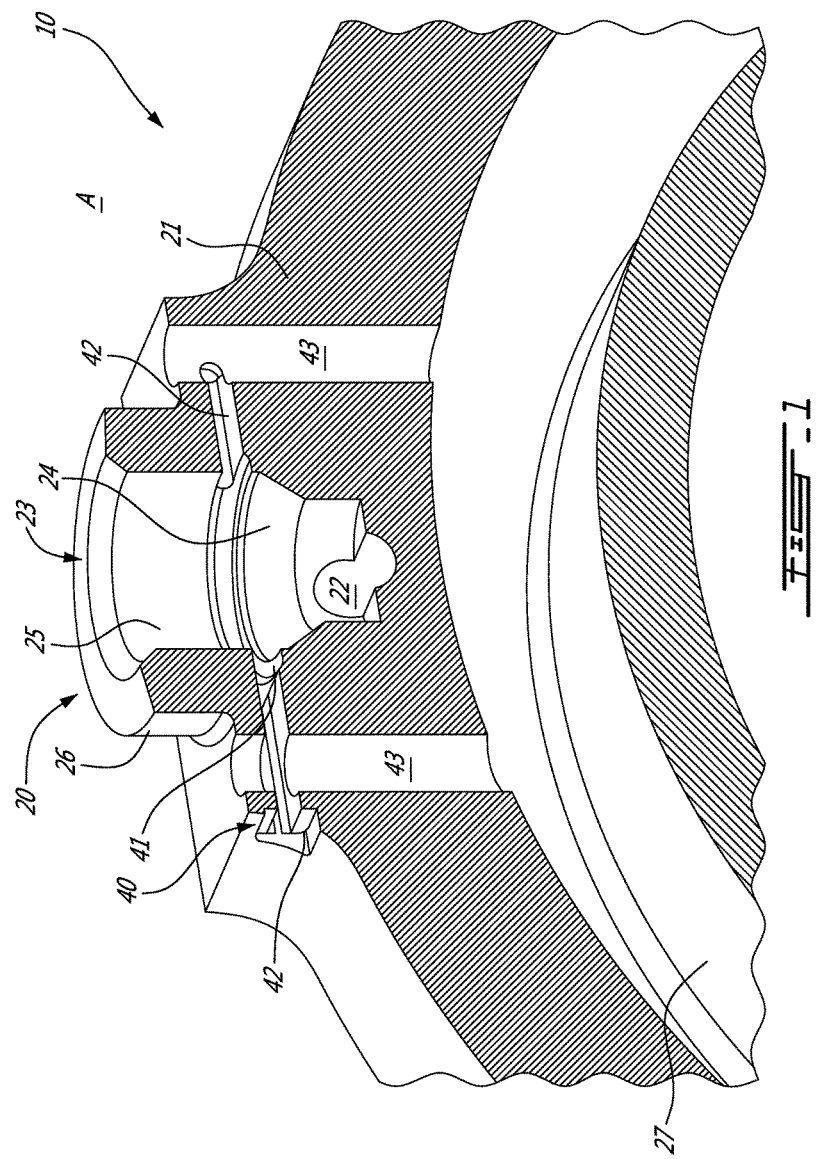
FIG. 1 is a perspective of a bearing housing with oil recuperation passage in accordance with an embodiment of the present disclosure.

FIG. 1 illustrates a cross-section of gas turbine engine 10 featuring a chamber A. The chamber A is for example part of a turbomachinery oil bearing chamber. A bearing housing 20 is located in the chamber A and may be one of multiple bearing housings 20 of the gas turbine engine 10, and is of the type enclosing bearings rotatably supporting a compressor or turbine rotor shaft assembly. The bearing housing 20 may have a generally annular geometry to surround the shafts, but other shapes are considered as well (e.g., box-shaped bearing housing). Oil tube 30 is part of an oil lubricating system of the type cycling oil between a heat exchanger, oil pump and filter, and the bearing housing 20, to lubricate bearings and/or dampers.

Figure 2:
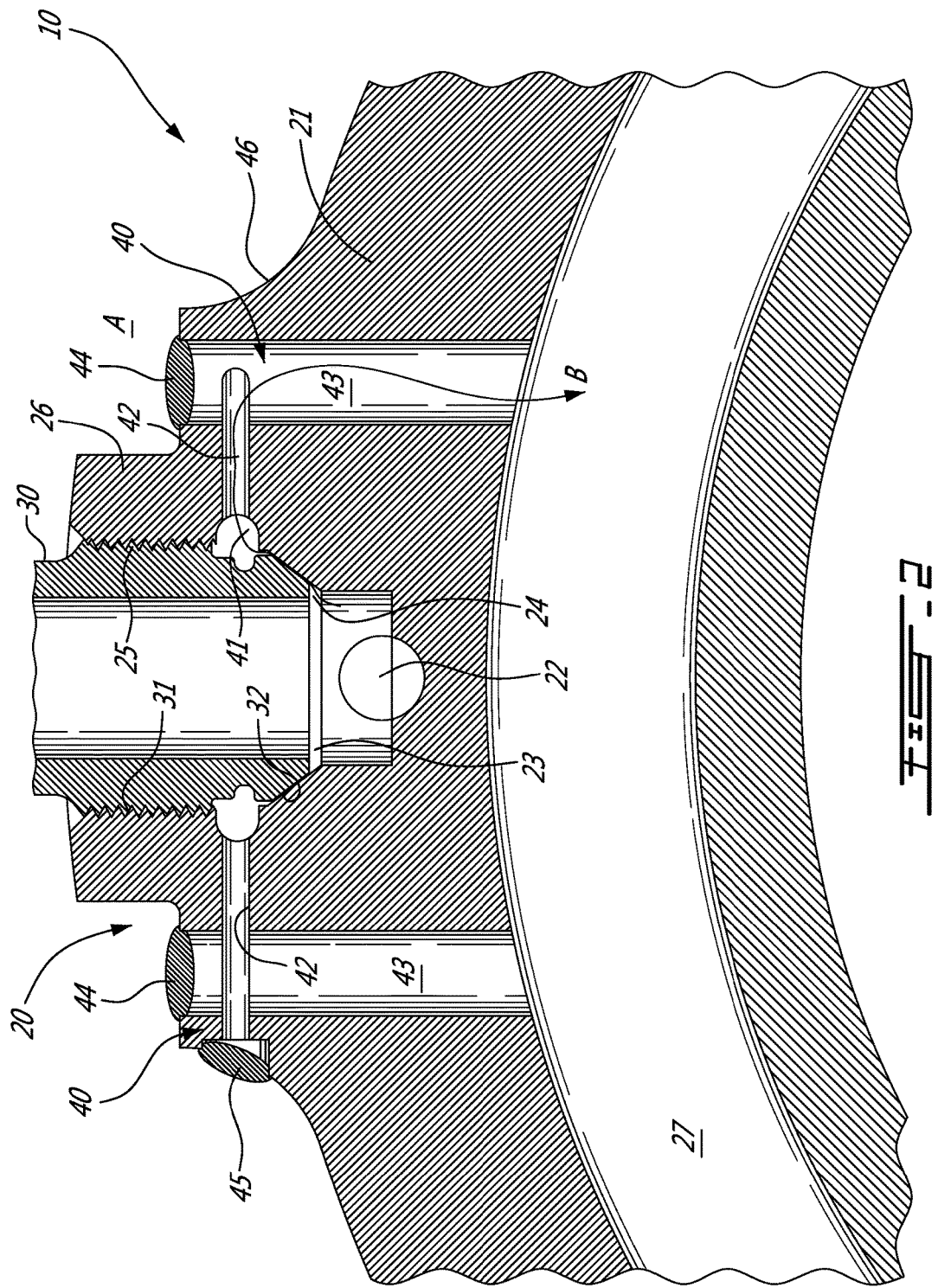
FIG. 2 is a cross-sectional view of the bearing housing of FIG. 1 in fluid communication with an oil tube, showing a recuperation path of oil.

Referring concurrently to FIGS. 1 and 2, the bearing housing 20 has a partition wall 21 that delimits an interior of the bearing housing 20 from its exterior, i.e., the chamber A in the illustrated embodiment. The partition wall 21 has an outer peripheral surface facing the chamber A, and an interior cavity 22 receiving an oil feed. The partition wall 21 may be an outer circumferential wall as in FIGS. 1 and 2, when the bearing housing 20 has an annular geometry. The interior cavity 22 may be an oil feed passage integrally and/or monolithically formed in the partition wall 21, as in FIGS. 1 and 2, or may take other forms, such as an oil plenum, an oil cavity, etc. The oil feed passage may be connected to oil jets to feed pressurized oil to these jets, so as to spray oil on bearings or dampers, the oil then scavenged back to other components of the oil lubricating system.

An inlet bore 23 is formed in the partition wall 21, and is in fluid communication with the interior cavity 22. The inlet bore 23 receives an end of the oil tube 30 to direct an oil feed from the oil tube 30 to the interior cavity 22. The inlet bore 23 may be machined, cast or formed directly into the partition wall 21. A sealing surface 24 is provided adjacent to the interior cavity 22. The sealing surface 24 may be a frusto-conical surface (commonly referred to as conical surface) arranged to taper the inlet bore 23 toward the interior cavity 22. Other sealing arrangements are considered, for instance by the presence of grooves for accommodating seals, etc. Such examples are provided with reference to FIGS. 3 to 5, below.

Tapping, i.e., internal threading 25 is provided on an inner peripheral wall of the inlet bore 23. The threading 25 may be monolithically integral in the partition wall 21, and may also be an added on sleeve, etc. The inlet bore 23 may be formed into a portion of the partition wall 21 defining a neck 26 or boss projecting away from a remainder of the outer peripheral surface of the partition wall 21, to ensure a suitable length of wall is provided for threading engagement of the oil tube 30 to the inlet bore 23.

An oil bearing housing cavity 27 may also be part of the bearing housing 20, and is essential an oil recuperating cavity. As observed in FIG. 2, the oil bearing housing cavity 27 may be annular in shape. The oil bearing housing cavity 27 collects the oil sprayed on the bearings and/or dampers. The oil bearing housing cavity 27 is in fluid communication with a return line connected to the other components of the oil lubrication system, to cycle the oil as mentioned above. The oil bearing housing cavity 27 will also receive leaked oil from a junction between the partition wall 21 and the oil tube 30, as described hereinafter.

Referring to FIG. 2, the oil tube 30 is shown as having threading 31 thereon adjacent its tip, and a frusto-conical surface 32 at its tip, although other end shapes are considered, such as square end. The oil tube 30 may be referred to as hose, pipe, conduit, among other possible names. The oil tube 30 is therefore in threading engagement with the threading 25 of the inlet bore 23, with the frusto-conical surface 32 simultaneously contacting the sealing surface 24 of the inlet bore 23, such that the open end of the oil tube 30 may feed its oil to the interior cavity 22 of the bearing housing 20. The cooperation of the frusto-conical surface 32 and the sealing surface 24 constitute a sealing barrier generally preventing oil leakage the partition wall 21 and the oil tube 30. As mentioned previously, other complementary sealing arrangements are considered to form a sealing barrier between the partition wall 21 and the oil tube 30, for instance using independent seals, gaskets, etc.

It is possible that oil leaks occur between the partition wall 21 and the oil tube 30. Accordingly, an oil scupper system is shown featuring a recuperation passage 40 provided in the bearing housing 20, in accordance with the present disclosure, to direct leaked oil to the oil bearing housing cavity 27. The recuperation passage 40 collects leak oil having leaked through the seal between the partition wall 21 and the oil tube 30, but before or at the threading engagement between the threading 25 and the oil tube 30. The recuperation passage 40 may have a circumferential annular groove 41 in a surface of the inlet bore 23. According to an embodiment, the circumferential annular groove 41 is machined or cast directly into the material of the partition wall 21, for instance concentrically positioned relative to the inlet bore 23. The annular groove 41 therefore defines a cavity surrounding the oil tube 30.

The recuperation passage 40 forms a passage from its annular groove 41 to the oil bearing housing cavity 27. The passage may be directly from the annular groove 41 to the oil bearing housing cavity 27, or may be split in a first subpassage 42 and a second subpassage 43, respectively plugged with plugs 44 and 45 in the outer peripheral surface 46 of the partition wall 21. Moreover, as shown in FIGS. 1 and 2, there may be more than one set of subpassages 42 and 43 in the recuperation passage 40, to provide more than one path for leaked oil to reach the bearing housing cavity 27.

The illustrated embodiment with the subpassages 42 and 43 may be used as a retrofit solution. The subpassages 42 and 43 shown in FIGS. 1 and 2 may be machined directly in the partition wall 21 from its outer peripheral surface, and then plugged. The pair or subpassages 42 may be the result of the extension of a first one through the inlet bore 23, such as shown in FIGS. 1 and 2, such that only one end needs to be plugged. One contemplated plugging solution is to use plug welds if the bearing housing 20 is made of an appropriate metallic material.

Hence, by providing the recuperation passage 40, leaked oil may be directed to the oil bearing housing cavity 27 with a flow induced for example by gravity. Moreover, there may be a negative pressure differential between the oil bearing housing cavity 27 and an environment of the bearing housing 20, i.e., the chamber A. The oil bearing housing cavity 27 is connected to the lubrication system and may thus subject to a pumping action of a pump, causing such a pressure differential. Moreover, the chamber A may be a location of the gas turbine engine 10 in which the pressure is normally higher during operation, assisting in creating a negative pressure condition that may guide leaked oil to the bearing housing cavity 27.

Referring to FIG. 2, a method for recuperating leaked oil in the bearing housing 20 is shown as following leaked oil path B. Pressurized oil is directed, via the oil tube 30, to a bearing housing interior cavity 22 in the bearing housing 20. The interior cavity 22 may be an oil feed passage connected to jets that will exhaust the oil onto bearings or dampers. Oil may leak into a junction between the partition wall 21 and the oil tube 30, at the seal between the oil tube 30 and the sealing surface 24 of the bearing housing 20. The leaked oil is recuperated in the recuperation passage 40 in the partition wall 21, for instance by the circumferential annular groove 41 radially formed into the inlet bore 23 between the sealing surface 24 and the threading 25. The recuperated leaked oil is directed by the recuperation passage 40 to the oil bearing housing cavity 27. The recuperation may be induced by a negative pressure differential between the oil bearing housing cavity 27 and an exterior of the bearing housing 20, i.e., the chamber A.

Figure 3:
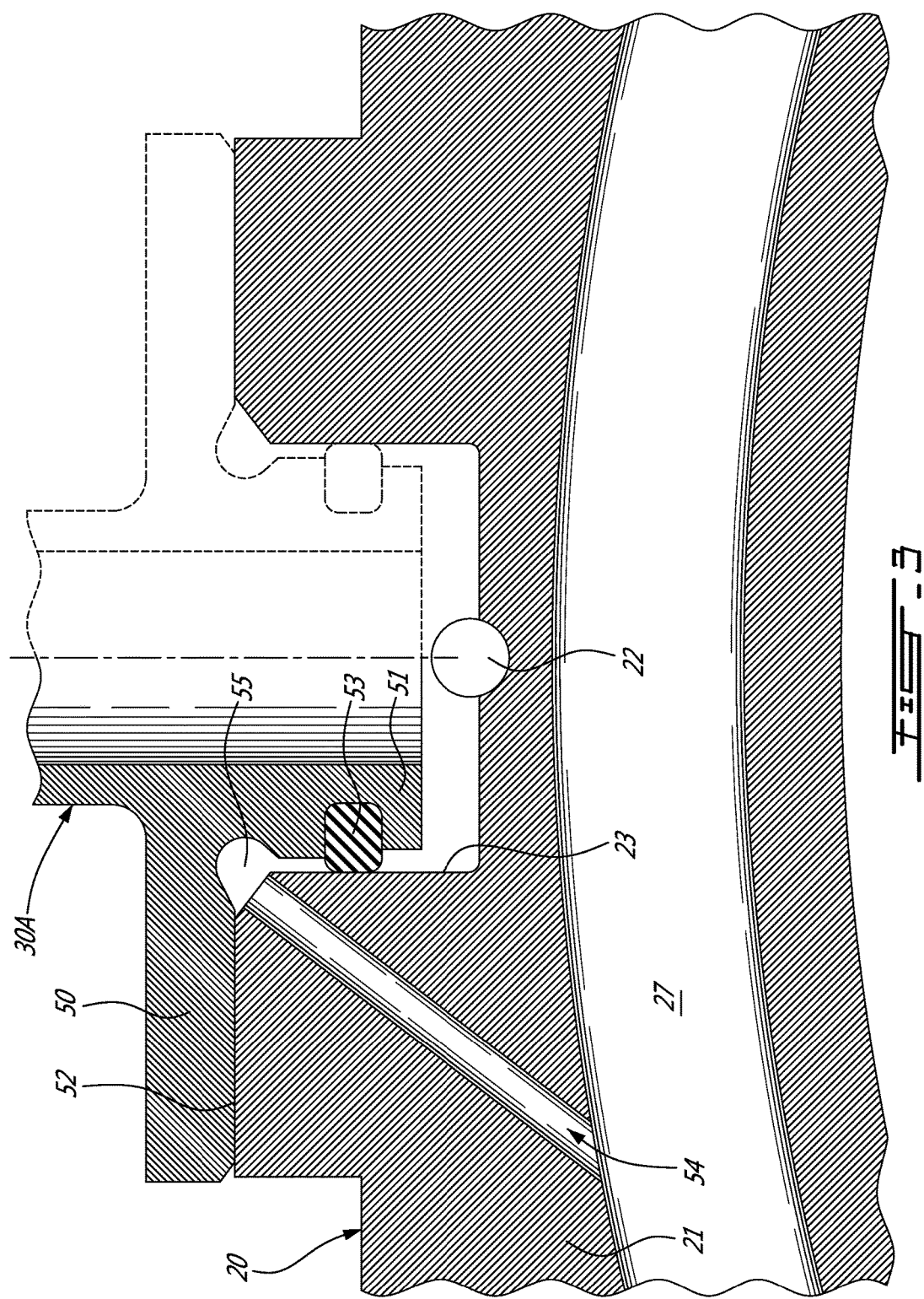
FIG. 3 is a schematic sectional view of a bearing housing with external tube connection and radial seal, with an oil recuperation passage in accordance with another embodiment of the present disclosure.

Referring to FIGS. 3-5, alternative embodiments of the interconnection between the bearing housing and the oil tube are shown.

In FIG. 3, the oil tube 30A has a flange 50 adjacent to its end 51, the end 51 received in the inlet bore 23 of the bearing housing 20. The flange 50 may be secured to the partition wall 21 by fasteners such as circumferentially-distributed bolts, whereby a contact surface 52 is defined between the flange 50 and the partition wall 21 forming a barrier against oil leakage. A radial seal 53 is between the inner surface of the inlet bore 23 and the oil tube 30A. In accordance with the present disclosure, a recuperation passage 54 may feature an annular groove 55 is between the seal 53 and the contact surface between the flange 50 and the partition wall 21, and is in fluid communication with an oil recuperating cavity of the bearing housing 20.

In FIG. 4, yet another embodiment is shown, but with similarities with the embodiment of FIG. 3, whereby like reference numerals will represent like elements. Instead of a radial seal, a face seal 60 is between the inner surface of the inlet bore 23 and the oil tube 30A.

In FIG. 5, yet another embodiment is shown, but with similarities with the embodiment of FIGS. 1 and 2, whereby like reference numerals will represent like elements. Instead of a conical seal between the inlet bore 23 and the oil tube 30, a face seal 70 is between the end of the inlet bore 23 and the oil tube 30.

The above description is meant to be exemplary only, and one skilled in the art will recognize that changes may be made to the embodiments described without departing from the scope of the invention disclosed. For example, the oil lubrication system can have different configurations, and the bearing housing 20 does not necessarily operate with jets but may instead have an oil cavity in which the bearings bathe in oil. Still other modifications which fall within the scope of the present invention will be apparent to those skilled in the art, in light of a review of this disclosure, and such modifications are intended to fall within the appended claims.

What is claimed is:

1. A bearing housing comprising:
    a body having a partition wall delimiting the bearing housing from an environment and defining a bearing housing interior cavity configured to receive an oil feed;
    an inlet bore in the partition wall in fluid communication with the bearing housing interior cavity, the inlet bore configured to receive an end of an oil tube, the inlet bore comprising a contact surface configured for contacting the oil tube;
    a seal between the inlet bore and the oil tube; and
    an oil recuperation passage defined in the partition wall in fluid communication with the inlet bore between the seal and at least a portion of the contact surface, the oil recuperation passage being in fluid communication with an oil recuperating cavity.

2. The bearing housing according to claim 1, wherein the seal is a conical sealing surface of the inlet bore.

3. The bearing housing according to claim 1, wherein the oil recuperation passage comprises a circumferential annular groove radially formed into a surface of the inlet bore.

4. The bearing housing according to claim 3, wherein the oil recuperation passage comprises at least a first subpassage machined from an outer peripheral surface of the partition wall to the circumferential annular groove and plugged at the outer peripheral surface.

5. The bearing housing according to claim 4, further comprising a plug weld to plug the first subpassage at the outer peripheral surface.

6. The bearing housing according to claim 4, wherein the oil recuperation passage comprises at least a second subpassage machined from the outer peripheral surface of the partition wall to the second end and plugged at the outer peripheral surface.

7. The bearing housing according to claim 6, further comprising a plug weld to plug the second subpassage at the outer peripheral surface.

8. The bearing housing according to claim 1, wherein the oil recuperation passage comprises at least a subpassage machined from an outer peripheral surface of the body to the second end and plugged at the outer peripheral surface.

9. The bearing housing according to claim 1, wherein the contact surface of the inlet bore is threading.

10. A gas turbine engine comprising:
    a chamber;
    an oil lubrication system having at least one oil tube passing through the chamber, the oil tube having an outlet end and threading;
    a bearing housing comprising:
        a body having a partition wall delimiting the bearing housing from the chamber and defining a bearing housing interior cavity for receiving an oil feed;
        an inlet bore in the partition wall in fluid communication with the bearing housing interior cavity, the inlet bore connecting the outlet end of the oil tube to the bearing housing, the inlet bore comprising a contact surface contacting a surface of the outlet end of the oil conduit, and a seal between its surface and the oil tube; and
        an oil recuperation passage defined in the partition wall in fluid communication with the inlet bore between the seal and at least a portion of the contact surface;
    an oil recuperating cavity in fluid communication with the oil recuperation passage,
    wherein, in operation, a negative pressure differential between the oil recuperating cavity and the chamber induces a flow of oil leaked from the bearing housing interior cavity to the oil recuperation passage.

11. The gas turbine engine according to claim 10, wherein the seal is a conical sealing surface, and an outlet end of the tube having a complementary shape.

12. The gas turbine engine according to claim 10, wherein the oil recuperation passage comprises a circumferential annular groove radially formed into a surface of the inlet bore.

13. The gas turbine engine according to claim 12, wherein the oil recuperation passage comprises at least a first subpassage machined in the partition wall from an outer peripheral surface to the circumferential groove and plugged at the outer peripheral surface.

14. The gas turbine engine according to claim 10, wherein the contact surface of the inlet bore is threading for screwing engagement with threading on the oil tube.

15. The gas turbine engine according to claim 10, wherein the oil recuperation passage comprises at least a subpassage machined in the partition wall from an outer peripheral surface to the second end and plugged at the outer peripheral surface.

16. A method for recuperating leaked oil in a bearing housing, the method comprising:
    directing oil, via an oil tube connected to an inlet bore in a partition wall of the bearing housing, to a bearing housing interior cavity in the bearing housing;
    leaking oil in the partition wall at a seal between an end of the oil tube and inlet bore;
    recuperating leaked oil in a recuperation passage in the partition wall, between the seal and a contact surface of the oil tube and the inlet bore; and
    directing the leaked oil to an oil recuperating cavity.

17. The method according to claim 16, wherein recuperating and directing the leaked oil to the oil recuperating cavity is induced by a negative pressure differential between the oil recuperating cavity and an exterior of the bearing housing.

18. The method according to claim 16, wherein recuperating leaked oil in a recuperation passage comprises recuperating the leaked oil in a circumferential annular groove radially formed into a surface of the inlet bore.

19. The method according to claim 16, wherein leaking oil comprises leaking oil in complementary conical surfaces of the end of the oil tube and the sealing surface of the bearing housing.

* * * * *